United States Patent [19]

Streusand et al.

[11] Patent Number: 5,324,498

[45] Date of Patent: * Jun. 28, 1994

[54] PURIFICATION OF TUNGSTEN HEXAFLUORIDE

[75] Inventors: Barry J. Streusand, Broomfield; Don A. Almond, Westminster; Robert E. Doane, Downieville, all of Colo.

[73] Assignee: Bandgap Chemical Corporation, Longmont, Colo.

[*] Notice: The portion of the term of this patent subsequent to Apr. 28, 2009 has been disclaimed.

[21] Appl. No.: 501,989

[22] Filed: Mar. 30, 1990

[51] Int. Cl.$^5$ .............................................. C01G 41/04
[52] U.S. Cl. ..................................... 423/489; 62/85; 62/119
[58] Field of Search ...................... 423/489; 62/119, 85

[56] References Cited

U.S. PATENT DOCUMENTS 3,992,159  11/1976  Mitchell ................................ 423/489
3,995,011  11/1976  Jache et al. .......................... 423/489
4,339,350  7/1982  Pellegrini, Jr. et al. ............. 423/489

FOREIGN PATENT DOCUMENTS 517565  10/1974  U.S.S.R. ................................ 423/489

Primary Examiner—Michael L. Lewis
Assistant Examiner—Brian M. Bolam
Attorney, Agent, or Firm—Hopgood, Calimafde, Kalil & Judlowe

[57] ABSTRACT

A process is provided for purifying liquid tungsten hexafluoride containing volatile and non-volatile impurities. The process comprises the steps of evaporating tungsten hexafluoride from non-volatile impurities dissolved in liquid tungsten hexafluoride and condensing the evaporated tungsten hexafluoride. The condensed tungsten hexafluoride is subjected to freezing to solidify the tungsten hexafluoride. Volatile impurities are then evacuated from the solid tungsten hexafluoride. Thereafter, the solid tungsten hexafluoride is thawed to liquid tungsten hexafluoride to release trapped volatile impurities and then heated to a temperature above the boiling point of tungsten hexafluoride under pressure in a closed container. The volatile impurities dissolved in the thawed tungsten hexafluoride are removed and collected above the thawed tungsten hexafluoride and vented into an evacuated space.

2 Claims, No Drawings

PURIFICATION OF TUNGSTEN HEXAFLUORIDE

The invention is directed to a process for purifying tungsten hexafluoride to produce a pure material useful in applications such as the electronics industry in which the impurities level is required to be reduced as much as possible to avoid adverse effects.

BACKGROUND OF THE INVENTION

Tungsten hexafluoride is a stable compound which melts at about 2.5° C. and boils at about 17.5° C. It is useful in applications such as the production of metallic surface coatings on electronic components such as chips, integrated circuits, memories and the like. For such purposes the compound desirably is brought to a high state of purity since certain impurities can have deleterious effects upon the operation of electronic components. Impurities present in crude tungsten hexafluoride can include sulfur hexafluoride, carbon tetrafluoride, hydrogen fluoride, fluorine, uranium, thorium, sodium, etc. Tungsten hexafluoride may be produced for example, by reacting metallic tungsten with fluorine as described in co-pending U.S. patent application Ser. No. 07/476,232 and filed Feb. 7, 1990, which is incorporated herein by reference. Tungsten contains a number of impurities in varying concentrations and fluorine is an extremely reactive element which is difficult to obtain in a pure state. Impurities contained in the raw materials and otherwise picked up in the synthesis reactions report in the product tungsten hexafluoride. The impurities to be removed have varying solubilities in liquid or solid tungsten hexafluoride and exhibit varying vapor pressures.

BRIEF DESCRIPTION OF THE INVENTION

The tungsten hexafluoride to be purified is first evaporated from the liquid and the resulting vapor is condensed into a cooled container to remove non-volatile impurities. The resulting condensate is then frozen to a solid and the space above the solid is evacuated to remove volatile impurities, the vapor pressure of $WF_6$ in the solid phase being low. The solid tungsten hexafluoride is then thawed and further volatile compounds removed from the gas phase above the liquid. The freeze thaw cycle can be repeated for further purification. The final purification step involves removal of dissolved volatile impurities. The $WF_6$ is heated to a temperature above the boiling point in a closed container and the resulting pressure is relieved by venting the gas phase above the boiling $WF_6$ into an evacuated space.

DETAILED DESCRIPTION OF THE INVENTION

In the initial step of the purification procedure, designed to remove non-volatile impurities, liquid $WF_6$ may be evaporated and transferred from a container having a temperature less than about 50° C., e.g., 25° C. to a cooled condensing chamber maintained at a temperature and pressure sufficient to condense $WF_6$, e.g., below about 17° C. at atmospheric pressure. The actual temperature of the liquid $WF_6$ in the container is maintained below the boiling point during the transfer because of evaporative cooling. The procedure removes impurities such as Ni, Cu, Ca, etc. and may be repeated if desired to remove further amounts of these.

After removal of the non-volatile compounds, the $WF_6$ is frozen to a solid at a temperature below the freezing point, e.g., 0° C., preferably in a container having a large gas space or volumen. Freezing reduces the vapor pressure of the $WF_6$ and permits removal of volatile gas phase impurities by evacuation of the gas space. After evacuation of the gas space, the $WF_6$ is thawed to a temperature above the melting point, e.g., 25° C. to release into the gas phase volatile compounds trapped in the solid phase. Such volatile compounds are removed from the gas space after refreezing or recooling the $WF_6$. The freeze-thaw cycle may be repeated if desired to remove impurities such as HF, $CF_4$, $SF_6$, etc. The final purification step involves further removal of volatile impurities dissolved in liquid $WF_6$, such as $N_2$, Ar, etc. This step is accomplished by heating liquid phase $WF_6$ above the boiling point, e.g., 25° C., under pressure in a closed container. The pressure is controllably relieved by venting into an evacuated container. The heated liquid has a lower solubility for dissolved gases, which collect in the gas space above the liquid and are removed by venting into the evacuated space.

The following example illustrates results achievable in accordance with the invention which gives the content of various impurities in $WF_6$ after the steps identified.

| Impurity | PPbw After Evaporation Condensation | PPM After First-Freeze Thaw | PPM After Venting From Pressurized Liquid |
|---|---|---|---|
| | PPbw Initial | | |
| Ni | 46 | 3 | |
| Cu | 10 | 1 | |
| Mo | 21 | <1 | |
| | PPM | | |
| $N_2$ | 268 | | 15 |
| $Ar_2$ | 218 | | 36 |
| HF | 20000 | 9000 | |
| $CF_4$ | 5044 | 14 | |

Although the present invention has been described in conjunction with preferred embodiments, it is to be understood that modifications and variations may be resorted to without departing from the spirit and scope of the invention as those skilled in the art will readily understand. For example, the various evaporation-condensation, freeze-thaw and venting steps can be interchanged without departing from the process in accordance with the present invention. Such modifications and variations are considered to be within the purview and scope of the invention and the appended claims.

What is claimed is:

1. A process for purifying liquid tungsten hexafluoride containing volatile and non-volatile impurities which comprises the steps a) evaporating tungsten hexafluoride from said non-volatile impurities dissolved in said liquid tungsten hexafluoride, b) condensing the evaporated tungsten hexafluoride, c) freezing the condensed tungsten hexafluoride to solid tungsten hexafluoride, d) evacuating volatile impurities from said solid tungsten hexafluoride, e) thawing said solid tungsten hexafluoride to liquid tungsten hexafluoride to release volatile impurities trapped in said solid tungsten hexafluoride to the gas phase, f) heating the thawed tungsten hexafluoride to a temperature above the boiling point of tungsten hexafluoride under pressure in a closed container whereby volatile impurities dissolved in the thawed tungsten hexafluoride are removed and collected above the thawed tungsten hexafluoride and heating the thawed tungsten hexafluoride, g) venting the volatile impurities collected above the thawed tungsten hexafluoride into an evacuated space.

2. The process as described in claim 1 wherein the steps c through g are repeated on the thawed and heated tungsten hexafluoride at least once.

* * * * *